Nov. 16, 1965 J. H. BEEBE 3,217,577
CUTTING MACHINE FOR CONTINUOUSLY CONVEYING AND CUTTING
MATERIAL INTO PRESELECTED UNIFORM LENGTHS
Original Filed July 23, 1958 5 Sheets-Sheet 1

INVENTOR
James H. Beebe
BY William E. Dominick
ATTORNEY

Nov. 16, 1965   J. H. BEEBE   3,217,577
CUTTING MACHINE FOR CONTINUOUSLY CONVEYING AND CUTTING
MATERIAL INTO PRESELECTED UNIFORM LENGTHS
Original Filed July 23, 1958   5 Sheets-Sheet 2

INVENTOR
James H. Beebe
BY William E. Dominick
ATTORNEY

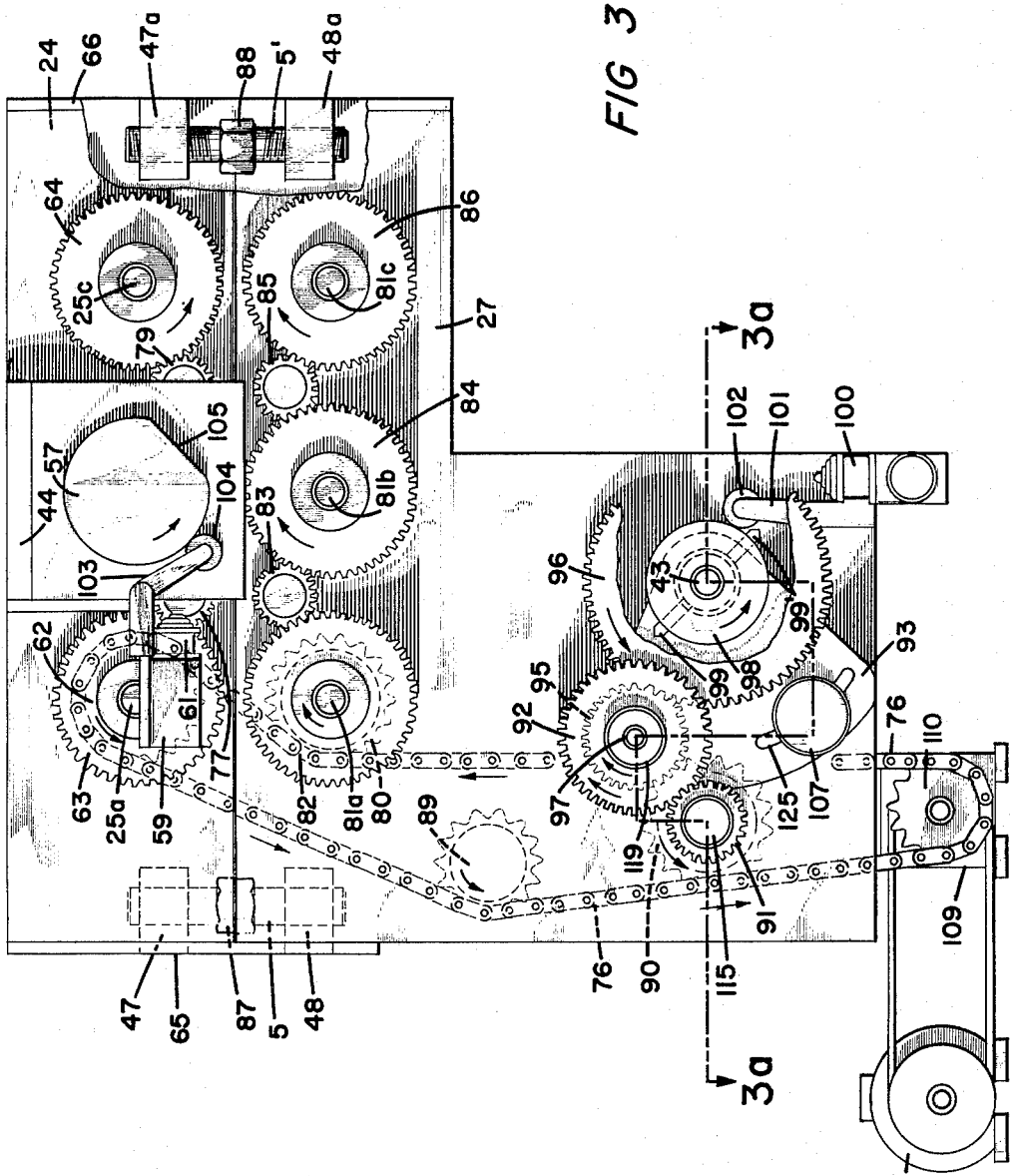

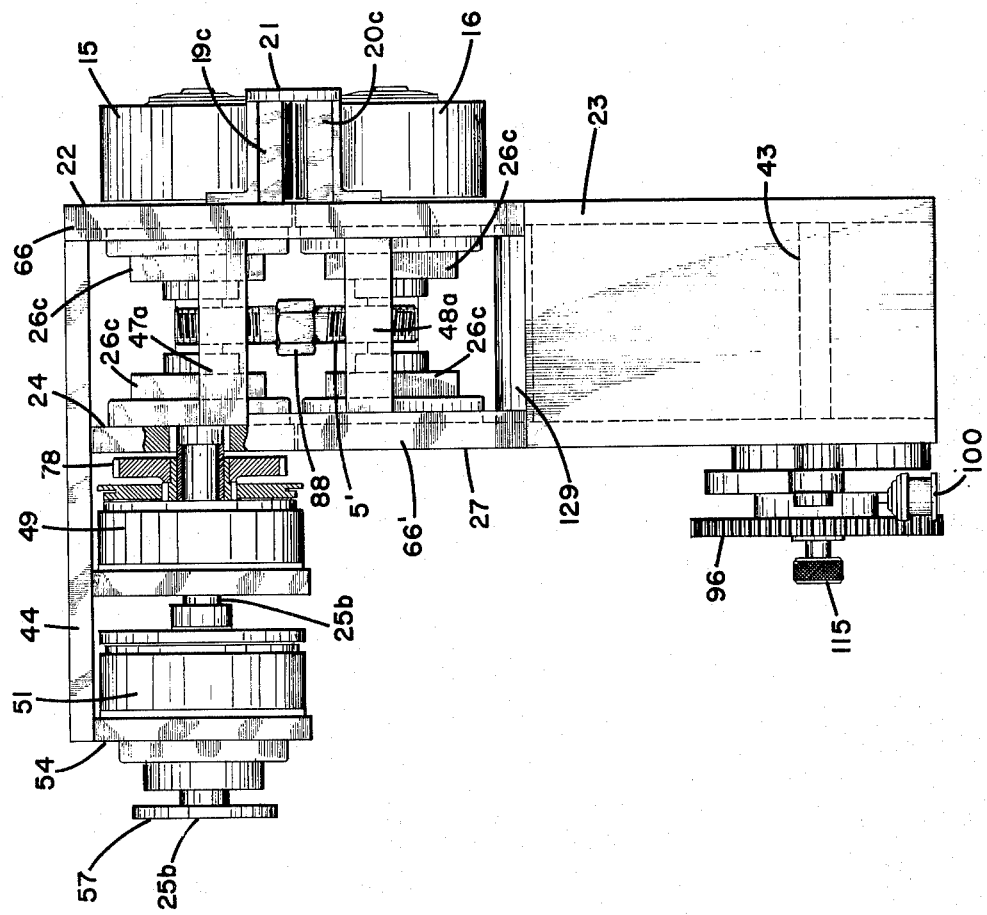

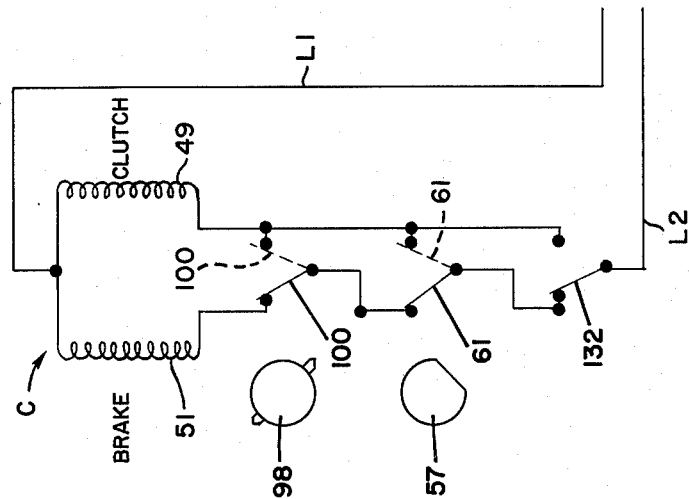
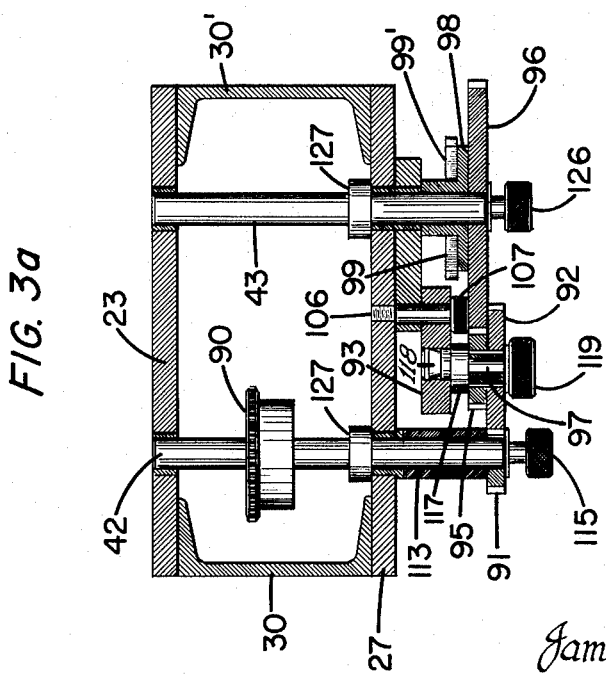

United States Patent Office 3,217,577
Patented Nov. 16, 1965

3,217,577
CUTTING MACHINE FOR CONTINUOUSLY CONVEYING AND CUTTING MATERIAL INTO PRESELECTED UNIFORM LENGTHS
James H. Beebe, Bayfield, Wis., assignor to Abbott Laboratories, North Chicago, Ill., a corporation of Illinois
Continuation of application Ser. No. 750,374, July 23, 1958. This application Mar. 14, 1963, Ser. No. 265,288
2 Claims. (Cl. 83—290)

This invention relates to a cutting machine and more particularly to a cutting machine which is adapted to continuously cut plastic tubing or the like into any desired predetermined lengths.

This application is a continuation of my copending U.S. patent application Serial No. 750,374, filed July 23, 1958, now abandoned.

Many types of continuous cutting machines have been devised to cut various kinds of materials. However, difficulties have arisen with continuous cutting machines because of bunching of the material and the consequent jamming of the machines with resulting loss of work hours and material. Also, when using the previously available continuous cutting machines much material has been wasted because the material was not always cut into the required uniform lengths.

It is therefore an object of the present invention to provide a cutting machine which will continuously convey and cut material into preselected uniform lengths.

Another object of this invention is to provide a cutting machine which will not become jammed with the material it is cutting.

A further object of this invention is to provide a cutting machine which will cut uniform lengths of material from a source of supply without the cutting wheel being in constant motion.

A still further object of this invention is to provide a cutting machine which will constantly cut predetermined uniform lengths of material and at any desired rate.

Still another object of the present invention is to provide a cutting machine which will cut material of varying diameters and thicknesses.

Other objects of this invention will be obvious to those skilled in the art from the detailed description and claims to follow.

In the drawings:

FIGURE 3 is a back side elevation view of the cutting machine of FIGURE 1 showing the drive arrangement of the machine.

FIGURE 3a is a sectional view taken along the line 3a—3a of FIGURE 3.

FIGURE 4 is an end view of the cutting machine of FIGURE 1.

FIGURE 5 is a diagrammatic view of the electrical circuit employed in the operation of the cutting machine.

Figure 1:
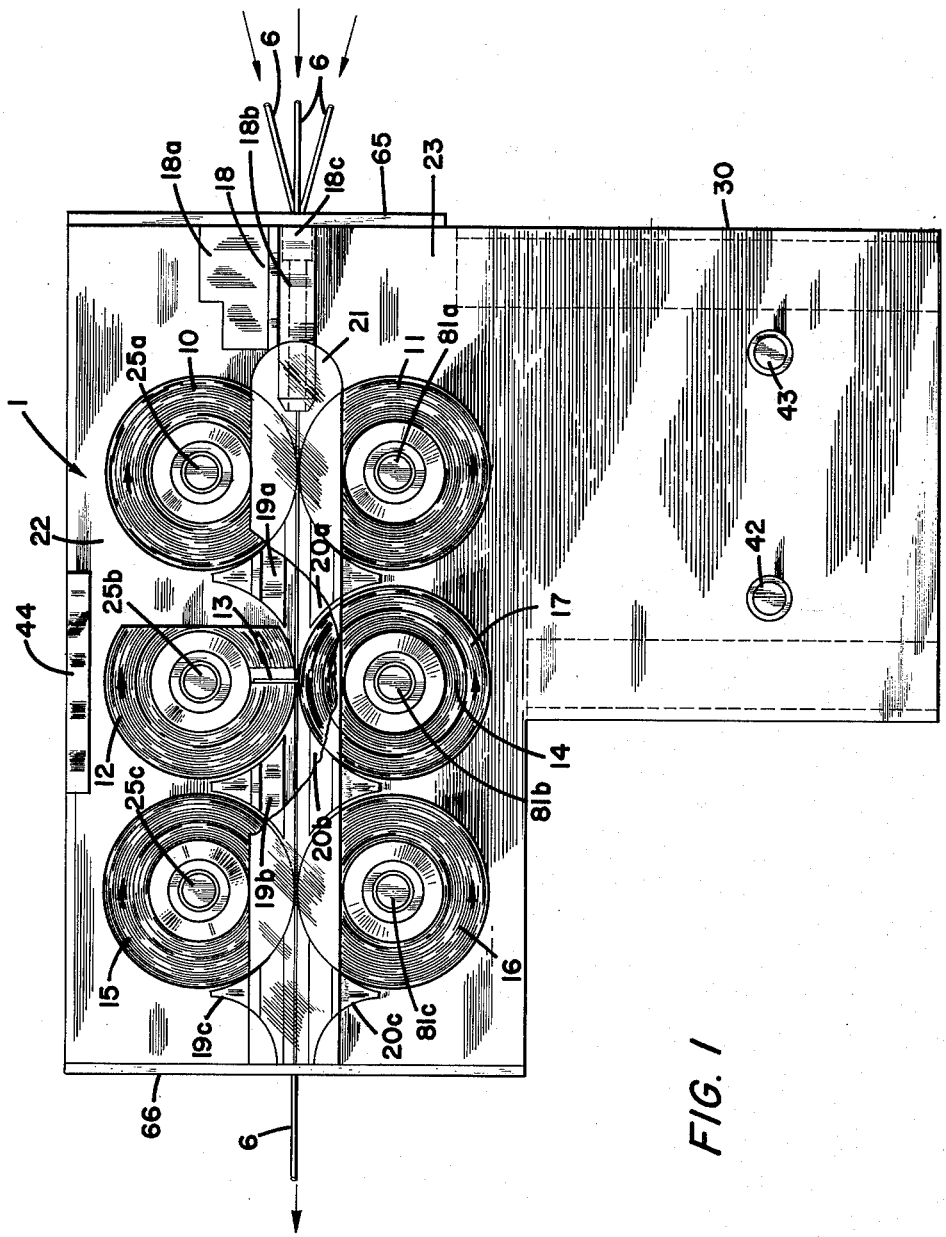
FIGURE 1 is a front side elevation view of the cutting machine.

The cutting machine of the present invention is comprised of a generally inverted L-shaped frame 1 formed of a lower front side section 23, a vertically movable spaced upper front side section 22, a lower back side section 27, and a vertically movable spaced upper back side section 24 separated laterally from the front sections 22 and 23 by upper spacer bars 45, 46, and a plurality of lower spacer bars 129. The lower front and back side sections 23 and 27, respectively, are secured to the supporting frame members 30, 30'. The upper frame sections 22, 24 which support the vertically movable portion of the head are movably secured to the lower frame sections 23, 27, by means of vertical spacer means 5, 5' and the head guides 65, 66, 65' and 66' which are mounted at opposite ends of the sections 22, 24, respectively.

A guide means 18 is fastened to the upper front frame section 22. The guide means 18 is comprised of an angle iron 18a having a metal block 18b welded to the underside thereof with a plurality of horizontally disposed tapered holes or guide passages 18c formed therein for receiving a length of tubing or the like in each of the said passages 18c.

The inner ends of the guide passages 18c terminate adjacent the vertically spaced upper and lower feed rolls or wheels 10, 11, respectively, mounted on shafts 25a, 81a, respectively, which are rotatably supported by the said frame side sections in a plurality of bearing assemblies 26a. Spaced laterally with respect to the feed rolls 10, 11 and lying in the same horizontal path as the said feed rolls is the tubing cutting roll 12 mounted on shaft 25b and having a rotary cutter 13 adjustably secured in cutting roll 12 by setscrews or the like to permit adjusting to compensate for different spacing of the head. A cutting block wheel 14 is mounted opposite roll 12 on shaft 81b. Shafts 25b and 81b are rotatably supported by the said frame side sections in a plurality of bearing assemblies 26b. Vertically spaced upper and lower guide rolls 15, 16, respectively, are disposed adjacent to and in the same horizontal plane as the cutting roll 12 and cutting block wheel 14, respectively, and are mounted on shafts 25c and 81c, respectively, rotatably supported by the frame side sections in a plurality of bearing assemblies 26c. Each of the said rolls has the same diameter and is preferably made of metal. The cutting block wheel 14 has the same outer diameter as the said rolls and is provided with a substantially rigid, non-metallic surface 17, such as nylon.

To facilitate continuous smooth passage of the tubing or the like between the rolls, upper guides 19a, 19b, 19c, respectively, are secured to the upper front side section 22 adjacent to the feed roll 10, the cutting roll 12, and the guide roll 15, respectively. Similarly, the lower guides 20a, 20b, 20c, respectively, are secured to the lower front side section 23 and are positioned adjacent to the lower feed roll 11, cutting block wheel 14, and guide roll 16, respectively. The oppositely disposed upper and lower guides are of a general triangular configuration with concave lateral surfaces which conform to the curvature of the said rolls and, if desired, may have longitudinal grooves on the flat surface thereof. A transparent plastic protective shield 21 is attached to the tubing guide 18 and the upper and lower guides 19a, 19b, 19c and 20a, 20b, 20c, respectively.

The novel cutting machine is adapted to accommodate various diameters of tubing or the like by adjusting the vertical spacer means 5, 5', respectively, which consist of two adjusting bolts 87 and 88, respectively, which have the opposite ends thereof threadably engaged in spacing bars 47, 48, and 47a and 48a, respectively, which are secured to the said front and back frame sections. Adjusting bolts 87 and 88 are disposed approximately equidistant from the respective frame sections and each are threaded with a left-hand thread at one end and a right-hand thread at the other end and are accommodated with like threading in the said spacing bars.

Figure 2:
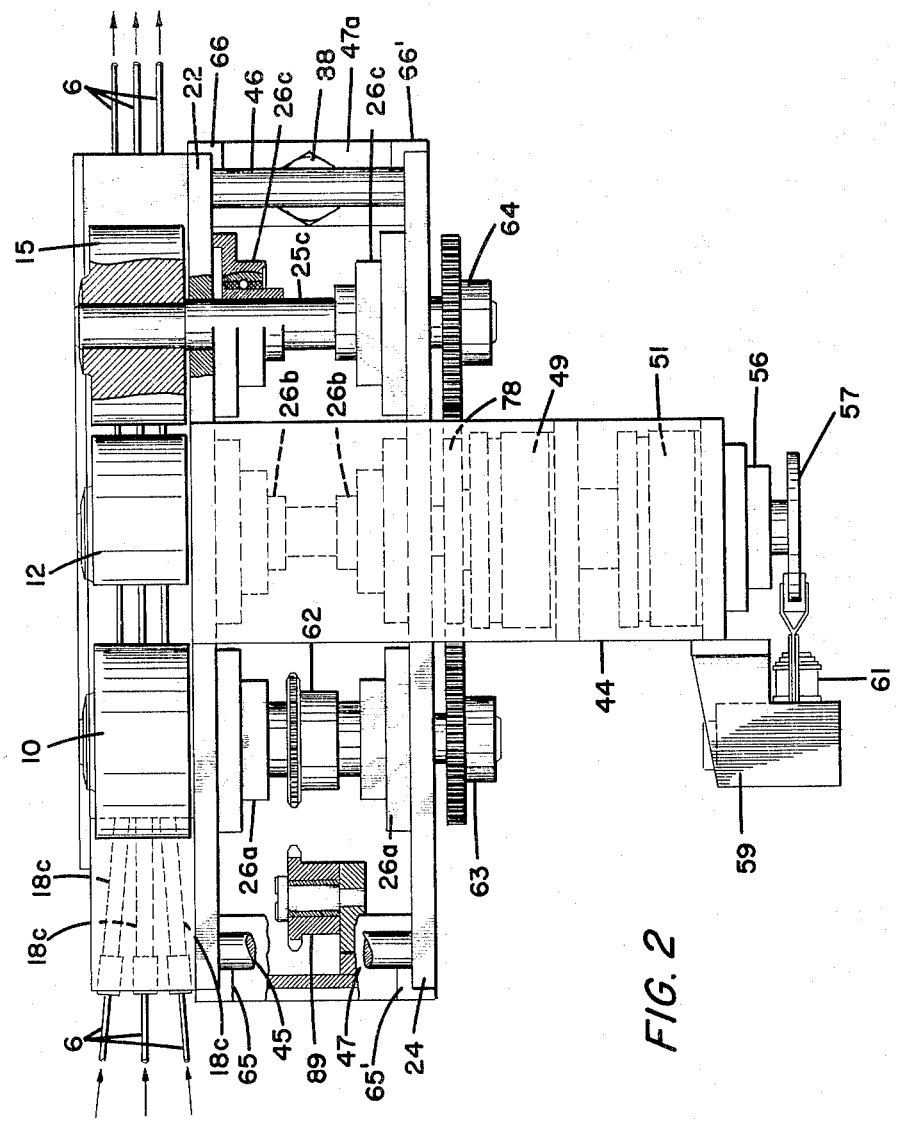
FIGURE 2 is a top plan view of the cutting machine of FIGURE 1.

On each of the drive shafts 25a, 25c, 81a, 81b, and 81c, respectively, at the end opposite to that having tubing contacting roll is secured a drive gear 63, 64, 82, 84, and 86, respectively. Shaft 25a to which the upper feed roll 10 is secured has positioned intermediate the ends thereof a drive sprocket 62 (see FIGURE 2). Drive shaft 81a on which the lower feed roll 11 is mounted also has secured thereto a drive sprocket 80 directly below sprocket 62. Both said drive sprockets 62 and 80 are engaged by an endless chain 76, as shown in FIGURE 3.

Drive gear 63 which is secured to the end of shaft 25a, engages the idling gear 77 which is rotatably mounted on the upper frame section 24. Idling gear 77 in turn engages drive gear 78 (see FIGURE 4) which is rotatably mounted on shaft 25b. Gear 78 in turn engages idling gear 79 which is rotatably mounted on the upper frame section 24. Gear 79 engages gear 64 which is secured on shaft 25c and thereby rotates upper guide roll 15.

The gear train which drives the lower rolls and cutting wheel is comprised of a drive sprocket 80 which is secured to shaft 81a and which has gear 82 mounted on the end thereof. Gear 82 engages idling gear 83 which is rotatably mounted in the lower frame section 27. Idling gear 83 in turn engages gear 84 which is secured to the end of shaft 81b and on which is disposed cutting block wheel 14. Gear 84 engages idling gear 85 which is rotatably mounted in lower frame section 27 and in turn engages drive gear 86 which is secured to the end of shaft 81c and thereby rotates lower guide roll 16 which is disposed on the opposite end of the shaft 81c.

Disposed near the lateral edge of lower frame section 27 and medially thereof is a chain guide and tension sprocket 89 which is rotatably mounted on the lower frame section 27. Sprocket 90 (see FIGURE 3a) is disposed directly below sprocket 89 and is rotatably mounted on shaft 42 approximately equidistant between lower frame sections 23 and 27. Gear 91 is mounted on the end of shaft 42, outside of the lower frame section 27, separated therefrom by a spacer bar 113, and is held in position on shaft 42 by threaded knob 115. Gear 91 meshes with gear 92 which is mounted on shaft 97. Disposed immediately behind gear 92, and secured to the shaft 97 is gear 95 which engages timing gear 96 which is secured to the outer end of shaft 43 by a threaded knob 126. The shaft 97, on which gears 92 and 95 are removably secured by means of threaded knob 119 has an eccentric cam assembly 117 integrally formed therewith to facilitate proper meshing of gear 95 with gear 96 when a different sized gear is placed on shaft 43 for the purpose of changing the timing of the machine. Eccentric cam assembly 117 is accommodated in adjusting plate 93 and is adjustably secured to said plate 93 by means of set screw 118.

Disposed immediately inwardly of the timing gear 96 on shaft 43, outside of lower frame section 27, is a timing wheel 98 which is comprised of a circular member having a pair of cam lobes 99, 99', mounted thereon in diametrically opposed position so that switch 100 (FIGURE 3) is tripped twice for every revolution of the timing wheel 98. The switch 100 is comprised in general of a spring tensioned lever arm 101 which has a small wheel 102 rotatably mounted at its upper end and is disposed at a predetermined distance from timing wheel 98 such that it is tripped when cam lobes 99, 99' each makes a contact with wheel 102. If desired, one of the cam lobes 99 or 99' can be omitted. The adjusting plate 93 having a slot 125 therein is pivotally mounted on shaft 43 between timing wheel 98 and the lower frame section 27. The adjusting plate 93 is held securely in any desired positions by means of threaded stud 106 which projects through plate 93 and onto which adjusting knob 107 is screwed to frictionally engage adjusting plate 93.

The source of power of moving the feed rolls 10, 11 and the guide rolls 15, 16 is preferably positioned below the frame 1 and in general comprises a drive motor 108 which transmits power to a gear box 109 which drives sprocket 110 which in turn engages with and drives the endless drive chain 76.

The intermittent drive mechanism for the cutting roll 12 is mounted on housing plate 44 which is disposed transversely in the upper edges of frame sectioins 22, 24. An electrically actuated electric clutch assembly 49 which intermittently operatively engages shaft 25b is secured to housing plate 44. Disposed immediately inwardly of the clutch 49 assembly is a continuously rotating gear 78 driven by gear 63 and with which clutch 49 engages when electrically activated. Shaft 25b is also intermittently engaged by an electrically actuated electric brake 51 which is secured to a downwardly extending plate 54 jointed to housing plate 44. The metal plate 54 also has secured thereto a cam bearing assembly 56 in which the shaft 25b is journaled and to which is secured the cutting wheel timing and brake cam 57. Since both the rotary cutter 13 and the cam 57 are mounted on the same shaft 25b, they both rotate in synchronism with each other. The cam 57 has a segment of its surface removed to provide a flat cam surface 105. A switch bracket 59 supporting switch 61 is mounted on the lateral edge plate 54. A spring tensioned lever arm 103 extending outwardly from switch 61, preferably having a small wheel 104 rotatably mounted at its lower end, rides against the cam 57 and intermittently activates switch 61.

The electrical circuit for the tube cutting machine is illustrated diagrammatically in FIGURE 5 in which gear cam 98 operates switch 100, brake cam 57 operates switch 61 and switch 132 is a manually operated control switch.

*Operation*

A source of power, represented by drive motor 108, located preferably near the bottom of the cutting machine drives chain 76 in a counterclockwise direction, as indicated by the arrows in FIGURE 3. The chain 76 first drives lower feed roll sprocket 80 which drives the lower gear train comprising gears 82, 83, 84, 85 and 86 and which in turn causes lower feed roll 11, lower cutting block wheel 14, and the lower guide roll 16 to rotate continuously. Chain 76 next engages upper feed roll sprocket 62 which drives an upper gear train comprising gears 63, 77, 78, 79 and 64 and which in turn causes upper feed roll 10, and upper guide roll 15 to rotate continuously.

With the said feed and guide rolls thus rotating continuously, one or more lengths of plastic tubing 6 or the like is inserted into guide means 18 until the tubing is engaged by the feed rolls 10, 11 which grip the tubing therebetween and convey the tubing past the cutting roll 12 and cutting block wheel 14 to the guide rolls 15, 16 which engage the tubing and convey the tubing out of the machine.

The cutting roll 12 is normally held by brake 51 in a non-rotating condition with the flattened side thereof in a downwardly position permitting the tubing to pass freely between the cutting wheel 12 and the cutting block wheel 14. When a sufficient length of tubing has passed and it is desired to cut the tubing, the cutting wheel 12 is actuated by the timing mechanism which is driven by sprocket 90. The sprocket 90 is driven by chain 76 and moves gear 91 which meshes with gear 92, driving gear 95 which meshes with gear 96 and drives timing wheel 98. As the chain 76 continuously moves through its cycle, timing wheel 98 is rotated at a rate which is determined by the gear ratios of gears 91, 92, 95 and 96. As timing cam 98 rotates its two oppositely disposed lobes 99, 99' trip switch 100 by means of switch arm 103. When switch 100 is tripped, it actuates the electrically actuated clutch 49 and simultaneously deactuates or de-energizes brake 51 (as shown in FIGURE 5), which causes the cutting wheel 12 to rotate and also causes cutting wheel cam 57 to rotate, and which in turn moves switch 61 to the clutch side of the circuit and to hold it there until the shaft makes a complete revolution whereupon switch 61 falls back to the brake side of the circuit. Meanwhile, timing cam or wheel 98 has rotated so that it is no longer actuating the switch 100 and as a result, has fallen back also to the brake side. The length of tubing to be cut is thus predetermined by the number of rotations in a given time of the timing wheel 98 which in turn is determined by the gear ratios of the said timing gears.

Reference to FIGURE 5 of the illustrative drawings indicates a control circuit generally indicated at C and the cam 98 and 57. The control circuit C includes a clutch circuit in parallel with a brake circuit. The clutch circuit is alternately established over a first path defined by an electrical lead L1, the electrically actuated clutch 49, the switch 100, the switch 61, the manual switch 132 and an electrical lead L2 assuming that the switches 100 and 61 are in the poistion shown by broken lines in FIGURE 5, and over a second path defined by the lead L1, the electrically actuated clutch 49, the switch 61, the manual switch 132 and the lead L2 assuming that the switch 100 is in the position shown by the solid line and switch 61 is in the position shown by the broken line in FIGURE 5. The brake circuit is established over the lead L1, the electrically actuated brake 51, the switch 100, the switch 61, the manual switch 132 and the lead L2. The leads L1 and L2 lead to a suitable source of electrical energy. It is, therefore, readily apparent that when the cam 98 trips the switch 100, the clutch circuit is established over the first path and the actuation of the clutch 49 is thereby commenced. The engagement of the clutch 49 causes the rotary cutter 13 and the cam 57 to rotate. Rotation of the cam 57 causes the switch 61 to establish the clutch circuit over the second path thereby holding or continuing the actuation of the clutch 49. When the cam 57 has rotated so that the switch 61 is tripped by the flat cam surface 105 at the profile of the cam 57, the switch 61 returns to the brake circuit to complete the reestablishment of the brake circuit which was partly reestablished when the switch 100 returned to brake circuit in response to the cam 98. Since the cam 57 has a predetermined profile, it dictates the predetermined movement of the rotary cutter 13.

In order to change the length of plastic tubing to be cut, all that need be done is to loosen knob 107 thereby releasing adjustment plate 93, remove knob 119 so that gear 92 can be removed and replace gear 92 with a gear of suitable size and number of teeth and finally replace knob 119. The adjustment plate 93 with the new gear 92 secured in place thereon is then positioned so that the gear 92 meshes with gear 91 and knob 107 is tightened.

If it is desired to cut lengths of plastic tubing or the like into lengths less than the circumference of the cutting roll 12, it should be understood that the cutting roll can be provided with a plurality of cutting blades. Thus, when the manual switch 132 is moved to the clutch side and the clutch engages with the drive means to continuously rotate the cutting roll, short lengths of tubing or the like are cut continuously with the length thereof depending upon the spacing between the cutting blades mounted on the cutting roll.

It should also be understood that instead of using an electrical brake and electrical clutch means as in the preferred embodiment of the present invention, it is possible to use a mechanical brake and a mechanical clutch means associated with a solenoid and switch or with a direct mechanical linkage instead of the solenoid and switch to effect the desired intermittent rotation of the cutting roll. Also, it should be understood that instead of using the preferred series of interchangeable timing gears to change the relative speed of rotation of the timing cam with respect to the feed and guide rolls, it is possible to use a standard variable pitch sheave to effect changes in the length of tubing being cut by the machine.

While the foregoing description has referred specifically to plastic tubing as material suitable for being cut into uniform lengths by the herein disclosed cutting machine, it should be understood that other tubing, such as rubber tubing, and tape, cord, rope, wire and the like material which is normally wound on reels or spools or coiled can also be readily cut into uniform lengths by the present cutting machine. Also, simply by increasing the width of the several rolls, and introducing a web of material directly into the feed rolls, it is possible to cut a web of sheet material, such as paper, plastic, rubber, metal foil or the like into uniform sections with the machine of the present invention.

Others can practice the invention in any of the numerous ways which are suggested to one skilled in the art by this disclosure. All such practice of the invention is considered to be a part hereof and falls within the scope of the appended claims.

What is claimed is:

1. In a machine for cutting an elongated piece of material into a plurality of lengths: means for feeding a piece of elongated material along a path, a rotary cutter rotatable into said path to cut the elongated piece of material, a first cam, a second cam mounted for rotation in synchronism with said rotary cutter, means for driving said feeding means, said first cam, said rotary cutter and said second cam in timed relation with respect to each other, a clutch actuatable for alternately engaging and disengaging both said rotary cutter and said second cam from said driving means, a brake actuatable for alternately interrupting and enabling the rotation of both said rotary cutter and said second cam, means responsive to said first cam for deactuating said brake and for commencing the actuation of said clutch to commence rotation of said rotary cutter and said second cam, said second cam having a predetermined profile for dictating the predetermined rotation of itself and said rotary cutter, and means responsive to said second cam for continuing the actuation of said clutch to effect rotation of said rotary cutter and said second cam and for deactuating said clutch and substantially simultaneously reactuating said brake at the end of the predetermined rotation.

2. In a machine for cutting an elongated piece of material into a plurality of lengths: means for feeding a piece of elongated material along a path, a rotary cutter rotatable into said path to cut the elongated piece of material, a first cam, a second cam mounted for rotation in synchronism with said rotary cutter, means for driving said feeding means, said first cam, said rotary cutter and said second cam in timed relation with respect to each other, an electrically actuated clutch actuatable for alternately engaging and disengaging both said rotary cutter and said second cam from said driving means, an electrically actuated brake actuatable for alternately interrupting and enabling the rotation of both said rotary cutter and said second cam; a control circuit for alternately operating said clutch and said brake, said control circuit including a clutch circuit and a brake circuit in parallel with each other, two electrical leads leading from a source of electrical energy and connected to said clutch and brake circuits, a first switch common to both said clutch and brake circuits and a second switch common to both said clutch and brake circuits, said clutch circuit being alternately established over a first path defined by one of said leads, said electrically actuated clutch, said first switch, said second switch and said other lead and over a second path defined by said one lead, said electrically actuated clutch, said second switch and said other lead, said brake circuit being established over said one lead, said electrically actuated brake, said first switch, said second switch and said other lead, said first switch being responsive to said first cam to disestablish said brake circuit and to establish said clutch circuit over said first path for commencing the rotation of said rotary cutter and said second cam, said second switch being responsive to said second cam for continuing the rotation of both of said rotary cutter and said second cam by establishing said clutch circuit over said second path, said first switch returning to said brake circuit shortly after the actuation of said clutch in response to said first cam to partly reestablish said brake circuit, said second switch returning to said brake circuit in response to a predetermined rotation of said second cam to complete the reestablishment of said brake circuit.

(References on following page)

References Cited by the Examiner

UNITED STATES PATENTS

| | | | |
|---|---|---|---|
| 1,068,447 | 7/1913 | Raffel | 83—335 X |
| 1,321,161 | 11/1919 | Thomas | 83—322 |
| 2,326,916 | 8/1943 | Anderson | 83—285 |
| 2,407,316 | 9/1946 | McLaughlin | 83—290 |
| 2,518,011 | 8/1950 | Hoppe | 83—322 |
| 2,621,740 | 12/1952 | Shanley | 83—285 |
| 2,697,470 | 12/1954 | Sampatacos | 192—144 X |

WILLIAM W. DYER, Jr., *Primary Examiner.*

ANDREW R. JUHASZ, *Examiner.*